United States Patent [19]

Salensky

[11] Patent Number: 4,476,260

[45] Date of Patent: Oct. 9, 1984

[54] ZINC RICH COATINGS

[75] Inventor: George A. Salensky, Whitehouse Station, N.J.

[73] Assignee: Union Carbide Corporation, Danbury, Conn.

[21] Appl. No.: 545,648

[22] Filed: Oct. 26, 1983

[51] Int. Cl.$^3$ ............................................. C08K 3/08
[52] U.S. Cl. ................................... 523/402; 523/414; 523/415; 523/416; 523/459; 252/512; 428/418; 428/457
[58] Field of Search ............... 523/402, 414, 415, 416, 523/442, 459; 428/418, 457; 252/512

[56] References Cited

U.S. PATENT DOCUMENTS

| | | | |
|---|---|---|---|
| 3,730,743 | 5/1973 | McLeod | 106/1 |
| 3,730,746 | 5/1973 | Boaz | 106/287 SE |
| 3,776,881 | 12/1973 | Lerner et al. | 260/37 SB |
| 3,917,648 | 11/1975 | McLeod | 260/32.8 SB |
| 4,162,244 | 7/1979 | Bertram | 523/459 |
| 4,239,539 | 12/1980 | Ginsberg et al. | 106/1.17 |
| 4,277,284 | 7/1981 | Ginsberg et al. | 106/1.05 |

FOREIGN PATENT DOCUMENTS 2092593 8/1981 United Kingdom ............... 524/439

Primary Examiner—Lewis T. Jacobs
Attorney, Agent, or Firm—Bernard Francis Crow

[57] ABSTRACT

Zinc rich coatings with improved corrosion resistance are provided by a composition consisting essentially of zinc pigment, thermoplastic polyhydroxyether or thermosetting epoxy resin, an organosilane or its hydrolyzates and optionally aluminum trihydrate, and one or more dispersing agents.

18 Claims, No Drawings

ZINC RICH COATINGS

BACKGROUND OF THE INVENTION

This invention pertains to zinc rich coatings with improved corrosion resistance and more particularly to compositions containing thermoplastic polyhydroxyethers or thermosetting epoxy resins, and an organosilane or organosilane hydrolyzate. The composition can optionally contain one or more suspending agents to provide a more stable composition in storage.

Zinc rich coatings containing both thermoplastic polyhydroxyethers and aluminum trihydrate have been used for corrosion protection of metallic substrates. Being electricially conductive they can also be used where welding is used as a technique for joining metallic parts. This property lends itself well to the automobile industry where electrical spot welding is the preferred fabrication technique in the assembly of automotive components.

Replacing part of the older zinc pigment in the zinc rich compositions with aluminum trihydrate improved the salt spray resistance of thermoplastic polyhydroxy ether and other coatings on cold rolled steel.

However, even with these improved formulations some deficiencies still remained. Undesirable leach rates of zinc pigments and aluminum trihydrate in salt spray tests prompted a search for means to improve this property. Various surface active agents were investigated unsuccessfully.

It is therefore an object of this invention to provide a zinc rich coating composition with enhanced corrosion resistance for coated metallic substrates.

It is another object to provide metallic substrates with zinc rich coatings which have controlled leaching rates in the presence of salt and other aqueous sprays.

Other objects will become apparent to those skilled in the art upon a further reading of the specification.

SUMMARY OF THE INVENTION

A zinc rich coating composition providing enhanced corrosion resistance (and controlled leaching) for metallic substrates has been found consisting essentially of:

(a) A polyether selected from the class consisting of thermoplastic polyhydroxyethers and thermosetting epoxy resins:

(b) about 350 to about 1450 parts by weight per 100 parts of polyether of zinc pigment;

(c) about 0 to about 100 parts by weight per 100 parts of polyether of aluminum trihydrate;

(d) about 0.1 to about 5 parts by weight per 100 parts of zinc pigment and aluminum trihydrate of an organosilane or organosilane hydrolyzate, which silane possesses at least two to about three hydrolyzable groups bonded to the silicon thereof and a organic group which contains a polyalkylene oxide group;

(e) 0 to about 20 parts by weight per 100 parts of polyether of at least one suspending agent; and (f) 0 to about 100 parts by weight per 100 parts of thermosetting epoxy resin of an epoxy hardening agent.

DESCRIPTION OF THE INVENTION

The zinc pigment used in this invention is commercially available and preferably has a particle size of about 2 to about 15 microns. It is preferred to use zinc pigment having an average particle size of about 6 to about 7 microns.

The term "thermoplastic polyhydroxyether" herein refers to substantially linear polymers having the general formula:

$$[-D-O-E-O-]_n$$

wherein D is the radical residuum of a dihydric phenol, E is an hydroxyl containing radical residuum of an epoxide and n represents the degree of polymerization and is at least 30 and is preferably 80 or more. The term "thermoplastic polyhydroxyether" is intended to include mixtures of at least two thermoplastic polyhydroxyethers.

The thermoplastic poly(hydroxyethers) can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide generally in an aqueous medium at a temperature of about 10° to about 50° C. until at least about 60 mole percent of the epihalohydrin has been consumed. The thermoplastic poly(hydroxyethers) thus produced have reduced viscosities of at least 0.43. Reduced viscosity values were computed by use of the equation:

$$\text{Reduced Viscosity} = \frac{t_s - t_o}{ct_o}$$

wherein $t_o$ is the efflux time of the solvent (tetrahydrofuran, $t_s$ is the efflux time of the poly(hydroxyether) solution, c is the concentration of the poly(hydroxyether) solution in terms of grams of poly(hydroxyether) per 100 ml. of tetrahydrofuran.

The dihydric phenol contributing the phenol radical residuum, D, can be either a dihydric mononuclear or a dihydric polynuclear phenol such as those having the general formula:

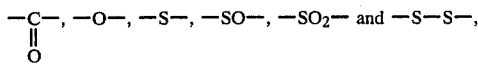

wherein Ar is an aromatic divalent hydrocarbon such as naphthylene and, preferably, phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, r and z are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or is a divalent radical including, for example $$-\underset{\underset{O}{\|}}{C}-, -O-, -S-, -SO-, -SO_2- \text{ and } -S-S-,$$

and divalent hydrocarbon radicals such as alkylene, alkylidene, cycloaliphatic, e.g., cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by a aromatic ring, a tertiary amino group, an ether linkage, a carbonyl group or a sulfur containing group such as sulfoxide, and the like.

Examples of specific dihydric polynuclear phenols include among others:

The bis(hydroxyphenyl) alkanes such as
2,2-bis-(4-hydroxyphenyl)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl)methane.
1,1-bis(4-hydroxyphenyl ethane,
1,2-bis(4-hydroxyphenyl)-ethane,
1,1-bis(4-hydroxy-2-chlorophenyl)ethane,
1,1-bis-(3-methyl-4-hydroxyphenyl)ethane,
1,3-bis(3-methyl-4-hydroxyphenyl)propane,
2,2-bis(3-phenyl-4-hydroxyphenyl)-propane,
2,2-bis(3-isopropyl-4-hydroxyphenyl)propane,
2,2-bis(2-isopropyl-4-hydroxyphenyl)propane,
2,2-bis-(4-hydroxylnaphthyl)propane,
2,2-bis(4-hydroxyphenyl)-pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxy-phenyl-1,2-bis(phenyl)propane,
2,2,-bis(4-hydroxyphenyl)-1-phenyl-propane and the like;

Di(hydroxyphenyl)sulfones such as bis(4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone and the like:

Di(hydroxyphenyl)ethers such as
bis(4-hydroxy-phenyl)ether, the 4,3'-, 4,2'-, 2,2'-, 2,3'-, di-hydroxydiphenyl ethers,
4,4'-dihydroxy-2,6-dimethyldiphenyl ether;
bis(4-hydroxy-3-isobutylphenyl)ether,
bis(4-hydroxy-3-isopropylphenyl)ether,
bix(4-hydroxy-3-chlorophenyl)-ether,
bis(4-hydroxy-3-flurophenyl)ether,
bis(4-hydroxy-3-bromophenyl)ether,
bis(4-hydroxynaphthyl)ether,
bis(4-hydroxy-3-chloronaphthylether,
bis(2-hydroxydiphenyl)-ether,
4,4'-dihydroxy-2,6-dimethoxydiphenyl ether,
4,4-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane and the bis-phenol reaction products of dipentene or its isomers and phenols such as 1,2-bis(p-hydroxyphenyl)-1-methyl-4-isopropylcyclohexane as well as bisphenols such as 1,3,3'trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula

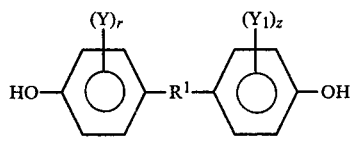

wherein Y and $Y_1$ are as previously defined, r and z have values from 0 to 4 inclusive and $R^1$ is a divalent saturate aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be monoepoxide or diepoxide. By "epoxide" is meant a compound containing an oxirane group, i.e., oxygen bonded to two vicinal aliphatic carbon atoms, thus,

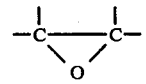

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., $>C=C<$ and acetylenic unsaturation, i.e., $-C\equiv C-$, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen $-O-$, oxacarbonyl oxygen

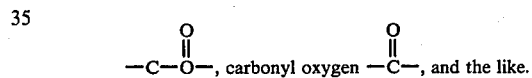

Specific examples of monoepoxides include epichlorohydrins such as epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and the like.

Illustrative diepoxides include diethylene glycol bis(3,4-eposycyclohexane-carboxylate), bis(3,4-epoxycyclohexyl-methyl)adipate, bis(3,4-epoxycyclohexylmethyl)phthalate, 6-methyl-3,4-epoxycyclohexylmethyl-6-methyl-3,4-epoxy-cyclohexane carboxylate, 2-chloro-3,4-epoxycylohexylmethyl-2-chloro-3,4-epoxycyclohexane-carboxylate, diglycidyl ether, bis(2,3-epoxycyclopentyl)-ether, 1,5-pentanediol bis(4-methyl-3,4-epoxycyclohexyl-methyl)ether, bis(2,3-epoxy-2-ethylhexyl)adipate, diglycidyl maleate, diglycidyl phthalate, 3-oxa-tetracyclo[4.4.0.1$^{7,10}$.0$^{2,4}$]-undec-8-yl 2,3-epoxy-propyl ether, bis(2,3-epoxycyclopentyl)sulfone, bis(3,4-epoxyhexoxypropyl)sulfone, 2,2'-sulfonyldiethyl, bis(2,3-epoxycyclopentanecarboxylate),3-oxatetracyclo[4.4.0.1$^{7,10}$.0$^{2,4}$]-undec-8-yl 2,3-epoxybutyrate, 4-pentenal-di-(6-methyl-3,4-epoxycyclohexylmethyl)acetal, ethylene glycol bis(9,10-epoxystearate), diglycidyl carbonate, bis(2,3-epoxybutylpenyl)-2-ehtylhexyl phosphate, diepoxydioxane, butadiene dioxide, and 2,3-dimethyl butadiene dioxide. The preferred diepoxides are those wherein each of the oxirane groups is connected to an electron donating substituent which is not immediately connected to the carbon atoms of that oxirane group. Such diepoxides having the grouping

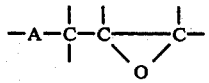

wherein A is an electron donating substituent such as

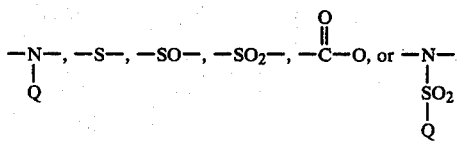

and Q is a saturated hydrocarbon radical such as an alkyl, cycloalkyl, aryl or aralkyl radical.

The preferred polyhydroxyether is available commercially as Bakelite Phenoxy PKHH, a trade designation of Union Carbide Corporation for condensation polymer derived from bisphenol-A (2,2-bis(p-hydroxyphenyl)propane and epichlorohydrin having the structural formula:

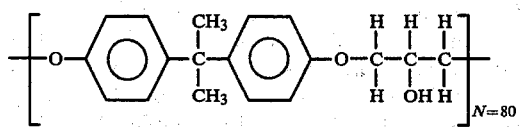

The phenoxy resin is available as a solution in glycol esters such as Cellosolve acetate (the acetate of a monoalkyl glycol ether sold under the Trademark Cellosolve by Union Carbide Corporation) or in pellet form which is readily soluble in a variety of solvents and solvent blends. The solid phenoxy resin sold under the designation PKHH by Union Carbide Corporation is soluble in the following solvents: butyl Carbitol, butyl Carbitol acetate, butyl Cellosolve, Carbitol solvent, Cellosolve acetate, Cellosolve solvent, diacetone alcohol, diethyl Carbitol, dimethylformamide, dimethyl sulfoxide, dioxane, ethoxy triglycol, mesityl oxide, methyl Cellosolve acetate, methyl ethyl ketone, and tetrahydrofuran.

Carbitol is a Trademark of Union Carbide Corporation for the monoalkyl ether of diethylene glycol.

The term "thermosetting expoxy resin" is defined in the text Epoxy Resins" by H. Lee and K. Nevelle, McGraw Hill Book Co., New York City 1957, as containing "reactive epoxy or ethoxyline groups

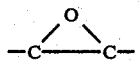

which serve as terminal linear polymerization points". These resins require crosslinking or cure through these groups converting them to tough, adhesive and highly inert solids. The epoxy resins are either viscous liquids or brittle solids depending on their average molecular weights which range from about 350 to about 10000. Although the most widely used class of epoxy resins are aromatic, polyglycidyl ethers of bisphenol A aliphatic epoxy resins can be used if desired. Both liquid and solid epoxy resins are commercially available from Shell Chemical Co., Dow Chemical Company, Ciba Co. Inc., Jones-Dabney Co. and others.

Suitable hardening agents for curing the thermosetting epoxy resins as well known to those skilled in the art. A list and description is given in the text "Epoxy Resins" referred to above on pages 30-140 incorporated herein by reference. Exemplary hardening agents include primary, secondary and tertiary amines, including aliphatic, cycloaliphatic and aromatic organic acids and anhydrides, phenolic resins, polyamide resins, such as, condensation products of dimerized and trimerized vegetable oil or unsaturated acids and aryl or alkyl polyamines, and the like.

Where suspending agents are used their nature is not critical an thus one can employ low molecular weight polyolefins, silane treated pyrogenic silica, quarternary amine treated hydrous magnesium aluminum silicate, and the like.

Suitable solvents are used in applying the coating composition to the particular metallic substrate. The solvents used depend upon the nature of the application method. Thus for example, in spray coating it has been found useful to employ a mixture containing an aliphatic ketone having about 3 to 6 carbons and aromatic hydrocarbons containing about 7 to 9 carbons plus optional aliphatic alcohols containing about 3 to 5 carbons, and the like. For roller-type applications one can use a mixture of Cellosolve acetate and aromatic hydrocarbons containing 7 to 12 carbons, and the like. It is convenient to use glycol esters such as Cellosolve acetate, (the acetate of a mono-alkyl glycol ether sold under the Trademark Cellosolve by Union Carbide Corporation).

The aluminum trihydrate used in this invention should preferably have a particle size which is about 1/5 to about 1/10 that of the zinc pigment in order to provide optimum packing properties of the zinc particles with the aluminum trihydrate particles. This provides better film integrity of the final coating and at the same time reduces the porosity of the film which minimizes penetration of the film by corrosive aqueous solutions. A preferred particle size range of the aluminum trihydrate used in this invention is about 0.25 microns to about 15 microns. A particularly preferred range is about 0.5 to about 1 micron.

While one can use about 0 to about 100 parts by weight, per 100 parts of thermoplastic polyhydroxyether of aluminum trihydrate, it is preferred to use about 25 to about 90 parts by weight of aluminum trihydrate and even more preferred about 30 to about 70 parts by weight of aluminum trihydrate.

Aluminum trihydrate is also known as aluminum hydrate, hydrated alumina and aluminum hydroxide, Al(OH)$_3$.

Suitable suspending agents which can be used in the composition of this invention include silane treated silica, (Philadelphia Quartz Company Quso WR-50) MPA-60 (colloidal polyolefin thixotropic agent, Caschem, Inc., quaternary amine treated magnesium aluminum silicate (Bentone-NL Industries), and the like. The function of the suspending agent is to prevent hard settling of the zinc pigment. Although up to about 20 parts of suspending agent per 100 parts by weight of thermoplastic polyhydroxyether can be used, it is preferred to use about 5 to 10 parts.

The organosilanes of this invention are characterized as structures having the following formula:

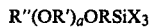     (I)

R in Formula (I) can be any divalent organic group which is either oxygen or carbon bonded to the silicon atom.

R may be any divalent radical which effectively joins the remainder of the molecular to the silicon atom. In essence, R is an inert moiety because it serves the function which contemplates two components joined together into one molecule. The first component is a hydrolyzable group characterized by the moiety—SiX₃ and the second component is the group characterized by the moiety (OR')ₐ. Though typically the relationship of the two molecules to each other in the classical sense of Coupling Agents, assuming the (OR')ₐ was termed organofunctional, would be dependent upon the size and chemical characterization of "R", that relationship is not apparent in the case of the instant invention. Thus given a particular "R", there exists an (OR')ₐ and a=-SiX₃ combination which provides the advantages of this invention.

Usually, when R is an extremely large or bulky moiety, its impact upon the utility of the organosilane of formula (I) can be mitigated by increasing the size of a and/or using a solvent, such as ethanol, when the silane is supplied to the alumina trihydrate.

Though other desirable R's will be illustrated hereinafter, the preferred R is an alkylene group containing from 1 to about 8 carbon atoms, preferably 2 to about 6 carbon atoms. R' is one or more 1,2-alkylene groups each containing at least 2 carbon atoms and typically not more than about 4 carbon atoms, preferably R'' is ethylene. R'' is hydrogen, an alkyl group containing 1 to about 8 carbon atoms, preferably 1 to about 4 carbon atoms, acyloxy (of 2 to about 4 carbon atoms) or an organofunctional group as defined below for R³, X is a hydrolyzable group such as alkoxy containing, for example, 1 to about 4 carbon atoms, alkoxyalkoxy in which the terminal alkyl contains 1 to about 4 carbon atoms and the internal alkyl is alkylene which contains 2 to about 4 carbon atoms and is preferably ethylene; acyloxy such as acetoxy, propionoxy and the like; aryloxy such as phenoxy, para-methylphenoxy; oximes; calcium oxide, sodium oxide or potassium oxide; and the like. In formula (I), a is a number having an average value of 4 to about 150, preferably about 4 to about 120.

The silane of formula (I) as a preferred embodiment is described in U.S. Pat. No. 2,846,458, patented Aug. 5, 1958. A particular illustration of that silane is set forth at Column 3, line 20, et sequence, of the aforestated patent. However, this invention is not to be construed as limited to the particular silanes which are described in the patent. For example, the patent is exceedingly restrictive in terms of the description of the divalent organic group which joins the polyether to the silicon atom. In accordance with this invention, that divalent organic group encompasses a much greater class of moieties.

Illustrative of the expanse of moieties encompassed by R above, are the following:

—CH₂CH₂CH₂—
—CH₂CH₂—

—CH CH₂—
   |
   CH₃

+CH₂CH₂—O)ₓ̄
   |
   (CH)ᵧ wherein c is 1 to about 20, x is 1 when y is 1 and 2 when y is 0, and y is 0 or 1;

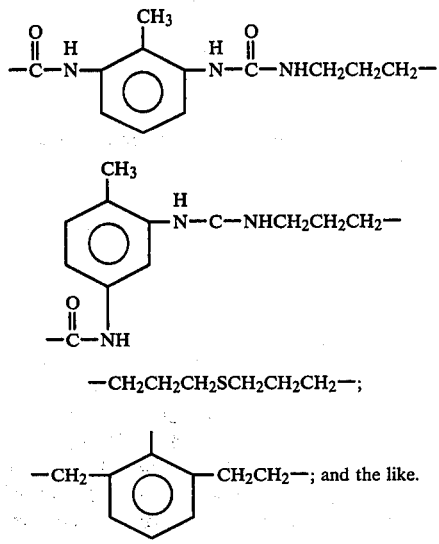

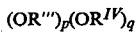

—CH₂CH₂CH₂SCH₂CH₂CH₂—;

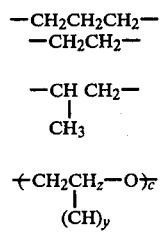

—CH₂—  CH₂CH₂—; and the like.

As can be seen from the above, the characterization of R is exceedingly diverse and its ultimate limits have not been ascertained except insofar as all experimental evidence has indicated that it constitutes a basically inert component as compared to the function of the hydrolyzable silicon moiety and the separate polyether moiety as characterized above.

Illustrative of the (OR')ₐ moiety of the silanes of formula (I) is the following:

(OR''')ₚ(OR^{IV})_q in which R''' and R^{IV} are different 1,2-alkylene radicals, in which R''' is ethylene and R^{IV} is 1,2-propylene or 1,2-butylene, p is a number greater than q and the sum of p and q is equal to the value of a.

The silanes of formula (I) may be used alone or in combination with another and different silane, such as one encompassed by formula:

$$R_n^3(SiX_{4-n})_b \qquad (II)$$

or the cohydrolyzate or the cocondensate of such silane with that of formula (I) above. In formula (II), n is equal to 0 to 1 and R³ is an organic radical whose free valence is equal to the value of b and can be alkyl group of 1 to about 18 carbon atoms, preferably about 3 to about 14 carbon atoms, or an organofunctional group bonded to silicon by a carbon to silicon bond. The organofunctional group thereof may be one or more of the following illustrative groups; vinyl, methacryloxymethyl, gamma-methacryloxypropyl, aminomethyl, beta-aminopropyl, gamma-aminopropyl, delta-aminobutyl, beta-mercaptoethyl, gamma-mercaptopropyl, gamma-glycidoxypropyl, beta-(3,4-epoxycyclohexyl)ethyl, gamma-chloroisobutyl, polyazamines such as described in U.S. Pat. No. 3,746,738, gamma-(beta-aminoethyl)-aminopropyl, (ethlyene beta-aminoethyl) methacryl ammonium hydrohalide, beta-(4-vinylbenzyl) (ethylene-beta-aminoethyl) ammonium hydrohalide, and the like. Any organo functional hydrolyzable silane suitable for use as a Coupling Agent may be employed in combination with the silane of formula (I).

When there is employed a combination of or co-reaction products of the silanes of formulas (I) and (II), the amount of silane of formula (I) employed should be that amount which provides a viscosity reduction and other advantages as hereindefined. Any amount of the silane formula (II) may be employed so long as such does not hinder the role of the silane of formula (I).

The silane of formula (I) can be separately employed with the silane of formula (II). For example, they can both be applied neat or from aqueous solution to the substrate simultaneously or in sequence, or they can be premixed and supplied to the treated surface together as a mixture or co-reaction product. The maximum amount of reaction of the silanes is less than that amount of condensation from the hydrolysis products which renders the condensation product insoluble in an aqueous solution which may or may not contain a water soluble solvent such as ethanol.

Illustrative of the diversity of organosilanes covered by formula (I) are the following:

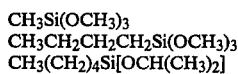
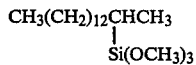
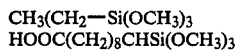
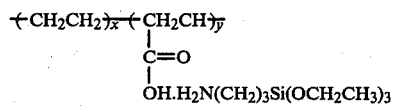
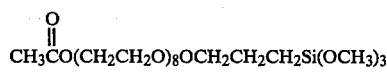
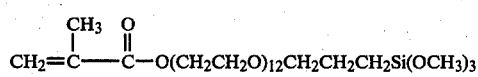
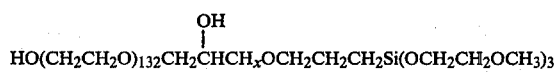
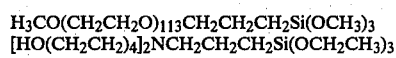
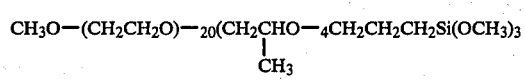
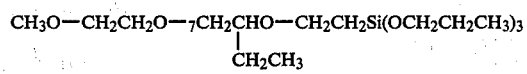
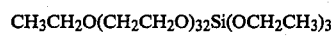
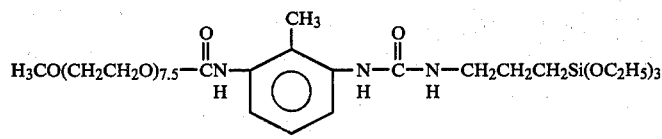
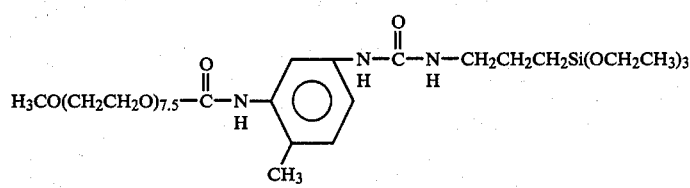
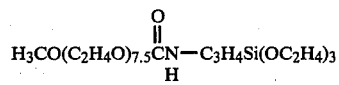
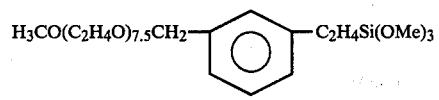

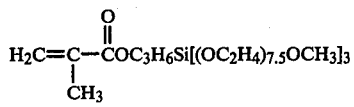

Suitable silanes of formula II useful in the practice of this invention include, by way of example only, the following:

CH₃CH₂Si(OCH₂CH₃)₃

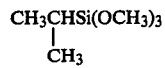

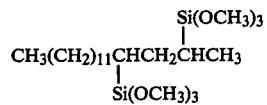

CH₃(CH₂)₁₇—Si(OC₂H₅)₃

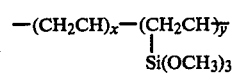

HOOCCH₂CH₂Si(OCH₂CH₃)₃
H₂N(CH₂)₃Si(OC₂H₅)₃
H₂N(CH₂)₄Si(OC₂H₅)
H₂NCH₂CH₂NHCH₂CH₂NHCH₂CH₂CH₂Si(OC₂H₅)₃

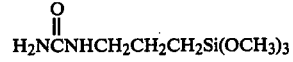

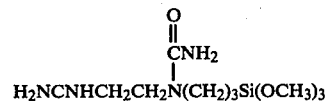

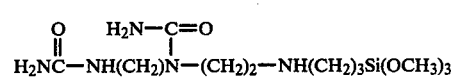

polyethyleneimine —(CH₂)₃Si(OCH₃)₃
polyethyleneimine —(CH₂)₃Si(OCH₃)₃—2

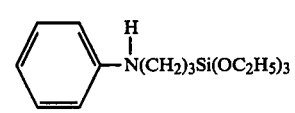

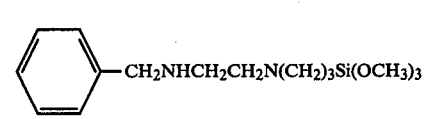

HOCH₂CH₂CH₂Si(OC₂H₅)₃
HOCH₂Si(OCH₃)₃
polyazamide-[CH₂CH₂CH₂Si(OCH₃)₃]₁₋₅

(See U.S. Pat. No. 3,746,748, for a complete description of silylated polyazamides).

CH₂=C(CH₃)COO(CH₂)₃Si(OCH₃)₃
CH₂=C(CH₃)COO(CH₂)₃Si(OCH₂CH₂OCH₃)₃
CH₂=CHSi(OCH₃)₃

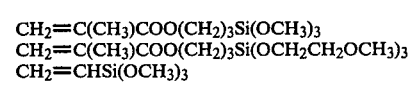

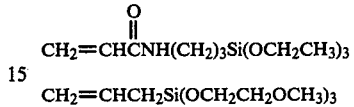

CH₂=CHCH₂Si(OCH₂CH₂OCH₃)₃

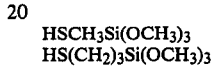

HSCH₃Si(OCH₃)₃
HS(CH₂)₃Si(OCH₃)₃

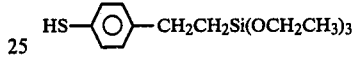

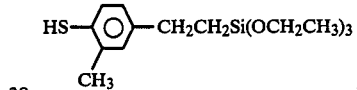

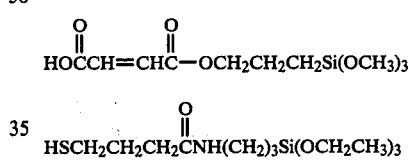

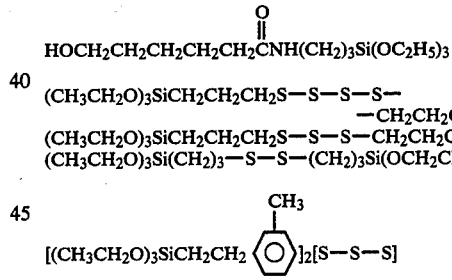

(CH₃CH₂O)₃SiCH₂CH₂CH₂S—S—S—
                          —CH₂CH₂CH₂Si(OCH₂CH₃)₃
(CH₃CH₂O)₃SiCH₂CH₂CH₂S—S—S—CH₂CH₂CH₂Si(OCH₂CH₃)₃
(CH₃CH₂O)₃Si(CH₂)₃—S—S—(CH₂)₃Si(OCH₂CH₃)₃

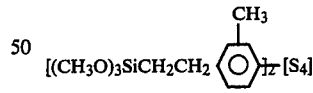

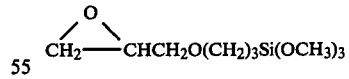

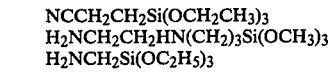

NCCH₂CH₂Si(OCH₂CH₃)₃
H₂NCH₂CH₂HN(CH₂)₃Si(OCH₃)₃
H₂NCH₂Si(OC₂H₅)₃

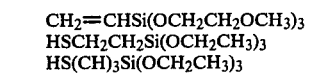

CH₂=CHSi(OCH₂CH₂OCH₃)₃
HSCH₂CH₂Si(OCH₂CH₃)₃
HS(CH)₃Si(OCH₂CH₃)₃

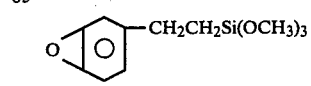

-continued

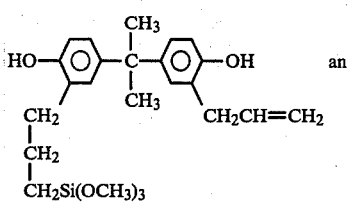 and the like.

Although about 0.1 to about 5 parts by weight of an organosilane or its hydrolyzates can be used, it is preferred to use about 1 to about 3 per 100 grams of zinc pigment and aluminum trihydrate.

Although about 350 to about 1450 parts by weight of zinc pigment per 100 parts of thermoplastic polyhydroxyether can be used, it is preferred to use about 400 to about 1300 parts or even about 410 to about 1000 parts.

The invention is further described in the examples which follow. All parts and percentages are by weight unless otherwise specified.

SILANE 1 Preparation of
$CH_3O(C_2H_4O)_{7.5}C_3H_6Si(OCH_3)_3$

Into a 1 liter 3 necked flask equipped with electric heating mantle, mechanical stirrer, thermometer, liquid dropping funnel and water cooled condenser is charged 398 gms., 1.0 mole, of $CH_3O(C_2H_4O)_{7.5}CH_2CH=CH_2$, prepared by reaction of CARBOWAX ® Methoxy Polyethylene Glycol 350 (Made by Union Carbide Corporation, New York, N.Y., U.S.A.) with stoichiometric sodium methoxide and allyl chloride in toluene solution, and 30 parts per million (ppm) of platinum added as a 5% solution of $H_2PtCl_6nH_2O$ (40% Pt) in isopropanol. By means of the dropping funnel, 149.0 gms., 1.1 moles, of $HSiCl_3$ is slowly added over a period of 1 hour beginning at 30° C. Heating is continued from 50° to 60° C. for 1 hour to complete reaction and excess unreacted $HiCl_3$ is recovered by distillation to a final pot temperature of 100° C. There results about 533 gms., 1.0 moles, of $CH_3O(C_2H_4O)_{7.5}C_3H_6SiCl_3$ in near quantitative yield, which analyzes 5.5 meg./gm of silyl chloride acidity as measured by titration with a 0.1N solution of sodium hydroxide. The latter chlorosilane adduct is treated over a period of 2 hours with excess methanol while heating at 70°–80° C. and maintaining continuous evacuation of by-product hydrogen chloride by means of a water aspirator. There results 520 gms., 1.0 mole, of $CH_3O(C_2H_4O)_{7.5}C_3H_6Si(OCH_3)_3$ in quantitative yield, containing less than 0.1 meg/gm titratable acidity.

EXAMPLES 1–8

The 8 compositions used to demonstrate this invention contained ½%, 1% and 2% of Silane 1 based on zinc plus aluminum trihydrate pigment weight. The Controls 1 and 5 contained no organosilane.

These compositions were prepared using a high speed mixer (Cowles). The silane, treated silica and MPA 60 were added to the resin solution and dispersed with the high speed mixer. If hydrated alumina was used, it was added at this point and dispersed to a Hegman Grind of 5.5 (ASTM-D 1210-79). The zinc pigment was then added and dispersed on the Cowles for 5 minutes at high speed.

The results obtained are delineated in Table 1 and Table 2 showing the effect of salt spray resistance on cold rolled steel panels coated with both the Controls and composition of the invention. Coatings were applied with a doctor blade and then baked in a 350° F. oven for 20 minutes to afford a dry film thickness of about 0.7 mils. They were then scribed and exposed to salt spray for times varying from 115 to 1000 hours.

The following code was used for exposure ratings of the coated panels:
10—No change
9—Very Slight Change
8—Slight Change
7—Medium +
6—Medium
5—Medium −
4—Slightly Bad
3—Bad
2—Very Bad
1—Partial Failure
0—Failure
Corrosion:
T-1=Rusting without blisters
T-2=Rusting with blisters
Interpretation of the tests provided in ASTM D 714-56.

TABLE 1

EFFECT OF POLYETHER SILANE ON CORROSION RESISTANCE OF ZINC RICH PHENOXY COATINGS

| | EXAMPLES | | | |
|---|---|---|---|---|
| | Control 1 | ½% Silane* 2 | 1% Silane* 3 | 2% Silane* 4 |
| PKHH/21% C.A.[1] | 150 | 150 | 150 | 150 |
| Treated Silica | 1.1 | 1.1 | 1.1 | 1.1 |
| MPA-60 | 0.7 | 0.7 | 0.7 | 0.7 |
| Zinc Dust | 315 | 315 | 315 | 315 |
| Hydral 710 | — | — | — | — |
| Organosilane[a] | — | 3.15 | 1.57 | 6.3 |
| Salt Spray Resistance DFT 0.7 mils[b] | | | | |
| Corrosion | | | | |
| 115 Hrs. | 7T2 | 10T2 | 8T2 | 7T2 |
| 220 | 5T2 | 8T2 | 6T2 | 7T2 |
| 500 | 4T2 | 8T2 | 5T2 | 7T2 |
| 790 | 2T2 | 7T2 | 4T2 | 6T2 |
| 1000 | 2T2 | 6T2 | 3T2 | 5T2 |

[a]Silane 1
[b]Dried film thickness
*Based on pigment weight
[1]Thermoplastic polyhydroxyether in Cellosolve acetate at a total solids (S) concentration of 21 weight %.

TABLE 2

EFFECT OF POLYETHER SILANE ON CORROSION RESISTANCE OF ZINC RICH PHENOXY COATINGS CONTAINING HYDRATED ALUMINA

| | EXAMPLES | | | |
|---|---|---|---|---|
| | Control 5 | ½% Silane* 6 | 1% Silane* 7 | 2% Silane* 8 |
| PKHH/21% C.A. | 150 | 150 | 150 | 150 |
| Treated Silica | 1.1 | 1.1 | 1.1 | 1.1 |
| MPA-60 | 0.7 | 0.7 | 0.7 | 0.7 |
| Zinc Dust | 252 | 252 | 252 | 315 |
| Hydral 710 | 21.2 | 21.2 | 21.2 | 21.2 |
| Organosilane[a] | — | 2.73 | 1.36 | 6.7 |
| Salt Spray Resistance DFT 0.7 mils[b] | | | | |
| Corrosion | | | | |

TABLE 2-continued
EFFECT OF POLYETHER SILANE ON CORROSION RESISTANCE OF ZINC RICH PHENOXY COATINGS CONTAINING HYDRATED ALUMINA

| | EXAMPLES | | | |
|---|---|---|---|---|
| | Control 5 | 1% Silane* 6 | ½% Silane* 7 | 2% Silane* 8 |
| 115 Hrs. | 8T2 | — | 10T2 | 8T2 |
| 220 | 7T2 | — | 9T2 | 7T2 |
| 500 | 7T2 | 9T2 | 9T2 | 7T2 |
| 790 | 5T2 | 8T2 | 7T2 | 7T2 |
| 1000 | 4T2 | 7T2 | 7T2 | 6T2 |

(a)Silane 1
(b)Dried film thickness
*Based on pigment weight

Tables 1 and 2 demonstrate the effect of silane 1 in improving the corrosion resistance of conventional zinc rich coatings and those modified with hydrated alumina to improve their performance. Formulation 1, which is the control zinc rich coating, retains a corrosion rating of 6 for less than 220 hours salt fog, whereas the hydrated alumina modified zinc rich coating has the same corrosion resistance for less than 790 hours. As shown above, a rating of 6 represents a medium corrosion condition.

If Silane 1 is used in the conventional zinc rich coating, the corrosion rating of 6 is increased from less than 220 hours to 1000 hours when 1% Silane 1 is added to the formulation. See Table 1. Other concentrations, ½% and 2%, are somewhat less effective but significantly improve the performance to 220 hours and 790 hours, respectively. The optimum level of Silane 1 would depend upon the particle size distribution or the surface area of the pigment.

Similar improvements are shown for Silane 1 modified zinc rich coatings containing hydrated alumina (Table 2).

The control formulation #5 retains a corrosion rating of 6 for less than 790 hours. Addition of 1% Silane 1 to the formulation increases the performance of the coating to more than 1000 hours. Similar improvements are seen for the ½% and 2% silane concentrations.

Therefore, Silane 1 was found to provide improved corrosion resistance to both conventional and hydrated alumina modified zinc rich coatings. The mechanism of the silane is not clearly understood but it is believed to react with the pigment surface to provide a more uniform leach rate of zinc and aluminum cations which protect the steel by a combination of pore plugging by precipitation of the hydroxides and steel passivation.

Unexpectedly, it was found that other organosilanes such as amino types, as for example, gamma-aminoproxyltriethoxysilane or its Michael addition product with methyl acrylate followed by amidation with gamma-aminoproxyltriethoxysilane, or N-beta (aminoethyl)-gamma-amino-proxyl trimethoxy silane, are not effective in the compositions of this invention since they react with the hydroxyl groups of the thermoplastic polyhydroxyether, causing crosslinking and instability problems.

Trade names of the materials used in the inventive compositions are tabulated below:

| | |
|---|---|
| Aluminum Trihydrate | Hydral 705 (½ micron) (Alcoa) |
| | Hydral 710 (1 micron) (Alcoa) |
| | C-331 (6-7 microns) (Alcoa) |
| Zinc Pigment | L-15 (Federated Metals Corp.) |
| Treated Silica | Quso WR-50 (Philadelphia Quartz) |
| MPA-60 | Suspending Agent (CasChem. Inc.) |

EXAMPLES 9-11

Following the procedures described in Examples 1-8 for zinc rich phenoxy (thermoplastic polyhydroxyether) coatings, thermosetting epoxy resins were subjected to like formulation and evaluation. Part A was made separate from Part B according to known epoxy coating formulation technique using a Cowles Dissolver. Part A and Part B were mixed for one hour before applying to cold roll steel panels with a doctor blade.

The results are presented in Tables 3 and 4.

EXAMPLES 12-14

Examples 9-11 were repeated with the exception that 20% of the zinc pigment was replaced with hydrated alumina. The results are delineated in Tables 5 and 6.

TABLE 3
EFFECT OF SILANE 1 ON SALT SPRAY RESISTANCE OF ZINC RICH EPOXY COATINGS

| | EXAMPLES | | |
|---|---|---|---|
| | 9 | 10 | 11 |
| Silane 1 Content | 0% | 1% | 2% |
| Part A | | | |
| Epon 1001(a) | 15.75 | 15.75 | 15.73 |
| Methyl Isobutyl Ketone | 10.5 | 10.5 | 10.5 |
| CELLOSOLVE | 10.5 | 10.5 | 10.5 |
| Xylene | 10.5 | 10.5 | 10.5 |
| MPA 60 | 4.7 | 4.7 | 4.7 |
| Zinc Pigment | 315 | 31 | 315 |
| Silane A | — | 3.15 | 6.30 |
| | 366.95 | 370.1 | 373.25 |
| Part B | | | |
| Versamid 401(b) | 26.25 | 26.25 | 26.25 |
| Isopropanol | 10.0 | 10.0 | 10.0 |
| DMP-30(c) | 0.4 | 0.4 | 0.4 |
| | 36.65 | 36.65 | 36.65 |

(a)Trademark of Shell Chemical Co. for a solid epoxy resin having an epoxide equivalent of 450-525 and an average molecular weight of 900-1000.
(b)Trademark of General Mills for a polyamide epoxy resin curing agent.
(c)Tris(dimethyl amino methyl) phenol sold by Rohm and Haas Co.

TABLE 4
SALT SPRAY RESISTANCE ON COLD ROLLED STEEL 0.65 MIL DRY FILM THICKNESS

| | EXAMPLES | | |
|---|---|---|---|
| | 9 | 10 | 11 |
| Silane 1 Content | 0% | 1% | 2% |
| Corrosion Rating | | | |
| 100 Hrs. | 4T-2 | 4T-2 | 10T-2 |
| 265 Hrs. | 3T-2 | 2T-2 | 7T-2 |

TABLE 5
SALT SPRAY RESISTANCE ON ZINC PHOSPHATED STEEL 0.75 MIL DRY FILM THICKNESS

| | EXAMPLES | | |
|---|---|---|---|
| | 9 | 10 | 11 |
| Silane 1 Content | 0% | 1% | 2% |
| Corrosion Rating | | | |

TABLE 5-continued

SALT SPRAY RESISTANCE ON ZINC PHOSPHATED STEEL 0.75 MIL DRY FILM THICKNESS

| | EXAMPLES | | |
|---|---|---|---|
| | 9 | 10 | 11 |
| 435 Hrs. | 7T-2 | 7T-2 | 8T-2 |
| 1010 Hrs. | 5T-2 | 6T-2 | 8T-2 |

TABLE 6

EFFECT OF A SILANE ON A SALT SPRAY RESISTANCE OF ZINC RICH EPOXY COATINGS WHERE 20% OF THE ZINC PIGMENT IS REPLACED WITH HYDRATED ALUMINA

| | EXAMPLES | | |
|---|---|---|---|
| | 12 | 13 | 14 |
| Silane 1 Content | 0% | 1% | 2% |
| Part A | | | |
| Epon 1001[a] | 15.75 | 15.75 | 15.73 |
| Methyl Isobutyl Ketone | 10.5 | 10.5 | 10.5 |
| CELLOSOLVE | 10.5 | 10.5 | 10.5 |
| Xylene | 10.5 | 10.5 | 10.5 |
| MPA 60 | 4.7 | 4.7 | 4.7 |
| Hydral 710 | 21.2 | 21.2 | 21.2 |
| Zinc Pigment | 252 | 252 | 252 |
| Silane A | — | 2.73 | 5.46 |
| | 325.15 | 327.88 | 330.61 |
| Part B | | | |
| Versamid 401[b] | 26.25 | 26.25 | 26.25 |
| Isopropanol | 10.0 | 10.0 | 10.0 |
| DMP-30[c] | 0.4 | 0.4 | 0.4 |
| | 36.65 | 36.65 | 36.65 |

[a]Trademark of Shell Chemical Co. for a solid epoxy resin having an epoxide equivalent of 450-525 and an average molecular weight of 900-1000.
[b]Trademark of General Mills for a polyamide epoxy resin curing agent.
[c]Tris(dimethyl amino methyl) phenol sold by Rohm and Haas Co.

TABLE 7

SALT SPRAY RESISTANCE ON COLD ROLLED STEEL 0.65 MIL DRY FILM THICKNESS

| | EXAMPLES | | |
|---|---|---|---|
| | 12 | 13 | 14 |
| Silane 1 Content Corrosion Rating | 0% | 1% | 2% |
| 100 Hrs. | 7T-2 | 10-T-2 | No Corrosion 10+ |
| 265 Hrs. | 4T-2 | 3-T-2 | 8-T-2 |

TABLE 8

SALT SPRAY RESISTANCE ON ZINC PHOSPHATED STEEL 0.75 MIL DRY FILM THICKNESS

| | EXAMPLES | | |
|---|---|---|---|
| | 12 | 13 | 14 |
| Silane 1 Content Corrosion Rating | 0% | 1% | 2% |
| 435 Hrs. | 7T-2 | 8T-2 | 8T-2 |
| 1010 Hrs. | 6T-2 | 7T-2 | 7T-2 |

Conclusions

Silane 1 is effective in upgrading the salt spray resistance of polyamide cured epoxy resin zinc rich coatings and those also containing hydrated alumina. This is true particularly at the 2% concentration of Silane 1 based on zinc or zinc plus hydrated alumina. It is effective on both cold rolled steel and zinc phosphated steel (Bonderite 40).

Although the invention has been described with a certain degree of particularity, it will be understood by those skilled in the art that the present disclosure of the preferred forms has been made only by way of example and that numerous changes and modifications can be made without departing from the spirit and the scope of the invention.

I claim:

1. A zinc rich coating composition consisting essentially of:
   (a) a polyether selected from the class consisting of thermoplastic polyhydroxyethers and thermosetting epoxy resins;
   (b) about 350 to about 1450 parts by weight per 100 parts of polyether, of zinc pigment;
   (c) about 0 to about 100 parts by weight per 100 parts of polyether, of aluminum trihydrate;
   (d) about 0.1 to about 5 parts by weight per 100 parts of zinc pigment and aluminum trihydrate of an organosilane or its hydrolyzates, which silane possesses at least two to about three hydrolyzable groups bonded to the silicon thereof an an organic group which contains a polyalkylene oxide group;
   (e) 0 to about 20 parts by weight per 100 parts of polyether of at least one suspending agent; and
   (f) 0 to about 100 parts by weight per 100 parts of thermosetting epoxy resin of an epoxy hardening agent.

2. Composition claimed in claim 1 containing about 25 to about 90 parts by weight of aluminum trihydrate.

3. Composition claimed in class 1 containing about 1 to about 3 parts by weight of an organosilane.

4. Composition claimed in claim 3 wherein the organosilane has the general formula:

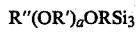

wherein R is a divalent organic group in which either oxygen or carbon is bonded to the Si atom; R' is one or more 1,2-alkylene groups each containing at least 2 carbon atoms and not more than about 4 carbon atoms; R" is a monovalent radical selected from the group consisting of hydrogen alkyl, acryloxy or an organofunctional group; X is a hydrolyzable group; and a is an integer having an average value of from 4 to about 150.

5. Composition claimed in claim 3 wherein the organosilane has the general formula:

6. Composition claimed in claim 3 wherein the organosilane has the general formula:

7. Composition claimed in claim 1 wherein the polyether is a thermoplastic polyhydroxyether.

8. Composition claimed in claim 7 wherein the thermoplastic polyhydroxyether is a reaction product of substantially equimolar amounts of a polynuclear dihydric phenol and epichlorohydrin, said thermoplastic polyhydroxyether having a degree of polymerization of at least about 80.

9. Composition claimed in claim 8 wherein the polynuclear dihydric phenol is 2,2-bis(4-hydroxyphenyl) propane.

10. Composition claimed in claim 1 wherein the polyether is a thermosetting epoxy resin.

11. Composition claimed in claim 10 wherein the thermosetting epoxy resin is a polyglycidyl ether of bisphenol A.

12. Composition claimed in claim 1 where the suspending agent is a treated silica present in an amount ranging from about 5 to about 10 parts by weight.

13. Corrosion resistant article comprising a metallic substrate and adhering thereto as a coating, a composition, comprising:
   (a) a polyether selected from the class consisting of thermoplastic polyhydroxy ethers and thermosetting epoxy resins;
   (b) about 350 to about 1450 parts by weight per 100 parts of polyether, of zinc pigment;
   (c) about 0 to about 100 parts by weight per 100 parts of polyether, of aluminum trihydrate;
   (d) about 0.1 to about 5 parts by weight per 100 parts of zinc pigment and aluminum trihydrate of an organosilane or its hydrolyzates, which silane possesses at least two to about three hydrolyzable groups bonded to the silicon thereof and an organic group which contains a polyalkylene oxide group; and
   (e) 0 to about 20 parts by weight of at least one suspending agent per 100 parts of polyether; and
   (f) 0 to about 100 parts by weight per 100 parts of thermosetting epoxy resin of an epoxy hardening agent.

14. Article claimed in claim 13 wherein the polyether is a thermoplastic polyhydroxyether reaction product of substantially equimolar amounts of a polynuclear dihydric phenol and epichlorohydrin, said thermoplastic polyhydroxyether having a degree of polymerization of at least about 80.

15. Article claimed in claim 13 wherein the polyether is a polyglycidyl ether of bisphenol A.

16. Article claimed in claim 13 wherein the organosilane has the general formula:

$$R''(OR')_aORSiX_3$$

wherein R is a divalent organic radical in which either oxygen or carbon is bonded to the Si atom; R' is one or more 1,2-alkylene groups each containing at least 2 carbon atoms and not more than about 4 carbon atoms: R" is a monovalent radical selected from the group consisting of hydrogen, alkyl, acryloxy or an organofunctional group, X is a hydrolyzable group; and a is an integer having an average value of from 4 to about 150.

17. Article claimed in claim 10 wherein the organosilane has the general formula:

$$H_3CO(CH_2CH_2O)_{7.5}CH_2CH_2CH_2Si(OCH_3)_3$$

18. Article claimed in claim 10 wherein the organosilane has the general formula:

$$H_3CO(CH_2CH_2O)_{113}CH_2CH_2CH_2Si(OCH_3)_3$$

* * * * *